United States Patent [19]

Dessart

[11] Patent Number: 4,889,641

[45] Date of Patent: Dec. 26, 1989

[54] PROCESS FOR THE NEUTRALIZATION OF A LAYER OF ACIDIC WATER OVER A SEDIMENT COMPRISING A HUMIC SUBSTANCE

[75] Inventor: Herman Dessart, Brussels, Belgium

[73] Assignee: Solvay & Cie, Brussels, Belgium

[21] Appl. No.: 267,306

[22] Filed: Nov. 4, 1988

[30] Foreign Application Priority Data

Nov. 12, 1987 [FR] France ................................ 87 15760

[51] Int. Cl.$^4$ ................................................ C02F 1/68
[52] U.S. Cl. ...................................... 210/752; 210/757; 210/758
[58] Field of Search ................ 210/749, 752, 753–763; 204/275; 114/61; 429/2, 47

[56] References Cited

U.S. PATENT DOCUMENTS 3,888,756  6/1975  Teshima et al. .................... 204/275
4,747,958  5/1988  Eberhardt ........................... 210/749

FOREIGN PATENT DOCUMENTS 0107204  5/1984  European Pat. Off. .

OTHER PUBLICATIONS

OPD –The Chemical Marketing Newspaper Hydrobiologia 92 537–547 (1982).

Primary Examiner—Frank Sever
Attorney, Agent, or Firm—Spencer & Frank

[57] ABSTRACT

Process for the neutralization of a layer of acidic water over a sediment comprising a humic substance, according to which blocks of a sodium compound are made to fall through the water layer and to enter the sediment at least partially.

11 Claims, 2 Drawing Sheets

PROCESS FOR THE NEUTRALIZATION OF A LAYER OF ACIDIC WATER OVER A SEDIMENT COMPRISING A HUMIC SUBSTANCE

BACKGROUND OF THE INVENTION

1. Field of the Invention

The invention relates to a process for neutralizing a layer of acidic water over a sediment in a lake, a pond or a water course comprising a humic substance.

2. Discussion of the Background

Acidification of water in lakes and watercourses is detrimental to aquatic life, because it modifies the biotope fundamentally. It is frequently the result of human activity such as acid rain and certain acidic aqueous residues, but it can also have a natural source, such as waters infiltrating through acidic soils.

A usual means of restoring the biotope of acidic lakes or watercourses consists of neutralizing the acidity of the water by means of a basic reactant such as sodium hydroxide or sodium carbonate, which is scattered onto the surface of the water (OPD—The Chemical Market Newspaper—Apr. 5, 1971—pages 5 and 41: "Soda Ash Helps Sweeten Up the Susquehanna River"). A disadvantageous peculiarity of this known process is that its action is of short duration and that, as a result, it must be frequently repeated.

To overcome this disadvantage, it has also been proposed to exploit the property possessed by the humic substances present in lake sediments, of behaving like cation exchangers by fixing the protons. To this end, consideration has been given to injecting an aqueous solution of sodium carbonate periodically in situ into the sediment, with the aim of regenerating the cation exchanger (Hydrobiologia—vol. 92 (1982)—Dr. W. Junk Publishers (The Hague)—G. K. Lindmark: "Acidified Lakes: sediment treatment with sodium carbonate—a remedy?"—pages 537 to 547). However, this known process involves a complicated and costly apparatus and its implementation is difficult, or even impossible, in the case of the treatment of deep lakes. Furthermore, its action is slow, because the neutralization of protons is effective only on contact with the humic substance in the sediment.

SUMMARY OF THE INVENTION

The invention is aimed at overcoming these disadvantages of the known processes by providing a new process which produces, in an easy and economical manner, a fast, effective and durable neutralization of the water in acidic lakes and watercourses.

The invention consequently relates to a process for the neutralization of a layer of acidic water over a sediment comprising a humic substance, according to which a sodium compound is introduced into the layer of water, According to the invention, the sodium compound is used in the form of blocks which are made to fall into the layer of water and to enter the sediment at least partially.

DETAILED DESCRIPTION OF THE PREFERRED EMBODIMENTS

Figure 1:
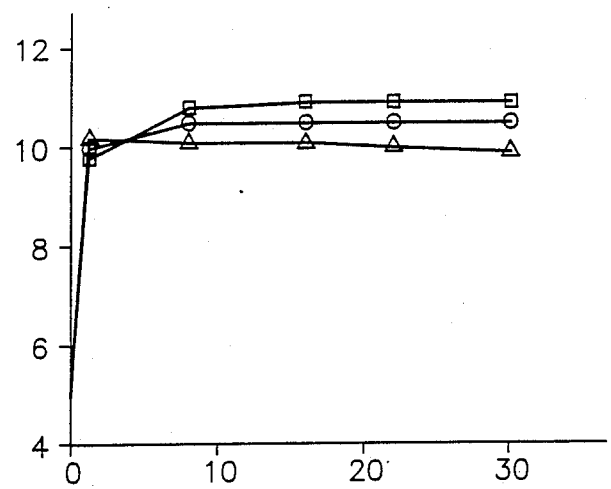
FIG. 1 is a diagram showing the change, as a function of time, in the pH of the water of a lake treated in accordance with a first embodiment of the process according to the invention.

In the process according to the invention, the sodium compound must be solid at the temperature of the layer of water and at least partially soluble therein. It maybe sodium hydroxide or a salt derived from an acid other than a hydracid (an acid which does not contain oxygen). Salts derived from weak acids such as those which, in normal aqueous solution, have a pH value higher than 2 are recommended. Salts derived from inorganic acids are preferred, especially sodium carbonate, sodium bicarbonate and sodium sesquicarbonate. Sodium carbonate is given preference.

The blocks of the sodium compound may be introduced into the water layer by any appropriate means. For example, in the case of a lake, a pond or a watercourse, they can be tipped in bulk into the water from the bank or from a boat. It is advisable to ensure a distribution of the blocks into the layer of sediment which is as homogeneous as possible.

According to the invention, the blocks act in two stages to neutralize the acidity of the water layer. In a first stage, the blocks dissolve progressively in the water layer during the fall and the dissolved sodium compound neutralizes the acidity of the water locally in situ. In the second stage, the part of the blocks which enters the sediment and is embedded therein dissolves progressively in the water impregnating the sediment and the resultant solution reacts with the acidic humic substance to convert the latter into a sodium-containing humic substance, according to the following cation exchange reaction (in the case where the sodium compound is sodium carbonate):

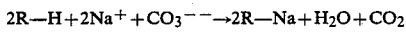

in which R—H denotes the acidic humic substance and R—Na the sodium-containing humic substance.

The sodium-containing humic substance can consequently take part in the neutralization of the acidity of the water layer, by ion exchange:

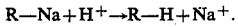

The respective importance of each of these two stages of neutralization depends on the relative proportion of the blocks which is dissolved during their fall through the water layer and on the proportion of the blocks which enters the sediment. It consequently depends on various parameters such as the depth of the water layer, the humic substance content of the sediment, the acidity and the rate of acidification of the water, the sodium compound employed, as well as the shape, the volume and the mass of the blocks. In general, for example, it is possible to choose the mass and the dimensions of the blocks as a function of the sodium compound employed, so that at least 30% of their mass reaches the sediment in solid form. It is advisable, nevertheless, that a sufficient proportion of the mass of the blocks dissolves in the water layer before reaching the sediment, in order not to slow down the neutralization process excessively. The optimum proportion depends on the acidity of the lake and it must therefore be investigated in each individual case. It may, for example, be equal to or greater than 1%, values which are at least equal to 2% being preferred. The preferred blocks are those for which the proportion of the mass which reaches the sediment in solid form is between 40 and 98%, preferably 50 and 95%. In case of very deep water layers or those encumbered with vegetation such as algae, the blocks may, if desired, be ballasted to speed their fall through the water layer. In case of highly acidic water layers, it may be found desirable to adapt the process so that at least 5% and, preferably, more than 10% of the mass of the blocks dissolves in the water layer before the blocks reach the sediment.

Everything else being equal, the efficiency of regeneration of the cation exchanger (consisting of the humic substance of the sediment) is increased when the degree to which the blocks enter the sediment is increased. This degree of entry depends on various parameters, especially the mass and the shape of the blocks, the depth of the water layer and the mechanical stability of the sediment. It is advisable, however, that the part of the blocks which is driven into the sediment should be in contact with enough water therein to dissolve progressively therein. The entry of the blocks into the sediment can be facilitated, for example, by ballasting them or by giving them an appropriate shape, for example pyramidal or conical, or by releasing them from a plane or helicopter.

The blocks employed in the process according to the invention may be monolithic. However, according to a particular embodiment of the invention, it is preferred to use agglomerates of particles, such as the ovoid briquettes of sodium carbonate marketed by Solvay & Cie for the desulphurization of pig iron in the iron and steel industry (brochure Tr 592a-B-0,5-277—Solvay & Cie). This embodiment of the invention lends itself well to an adaptation of the rate of dissolution of the blocks in the water layer and to their degree of entry into the sediment, as a function of the characteristics of the water layer to be treated. These properties of the blocks can, in fact, be adapted by an appropriate choice of the agglomerate compacting pressure or by the incorporation of a ballasting material or of a suitable binder. Where appropriate, it is obviously advisable to choose a ballasting material or a binder which does not have a detrimental effect on the aquatic flora or fauna. Use may be made, in particular, of agglomerates of sodium carbonate comprising Portland cement, sodium hydroxide, fly ash, metal oxides which are harmless to the aquatic environment (particularly iron oxides), silica or sodium silicate. The preferred blocks are agglomerates comprising between 95 and 98% by weight of sodium carbonate and between 2 and 5% by weight of sodium silicate. These preferred blocks can be produced by any known means; a recommended technique is that consisting in compacting particles of sodium carbonate in the presence of an aqueous solution of sodium silicate.

The process according to the invention is applicable to any layers of water lying over a light soil sediment comprising a humic substance, especially to natural or artificial lakes containing or having contained an aquatic flora or fauna and contaminated by acidic inflows such as acid rains, acidic ground water or runoffs or acidic discharges of industrial or municipal origin.

The examples whose description is to follow are used to illustrate the invention. They refer to FIGS. 1 to 4 of the attached drawings.

EXAMPLES

The examples whose description follows relate to laboratory tests which have been carried out on Lake Sännen in Sweden.

Three samples of sediment and water were taken from three regions corresponding to different depths of the lake. Table I gives, for each sample:
the depth of the lake in the sampled region,
the loss on ignition of the sediment which is a measure of its organic matter content.

TABLE I

| SAMPLE No. | DEPTH OF LAKE (m) | LOSS ON IGNITION (% by weight) |
| --- | --- | --- |
| 1 | 0.40 | 1 |
| 2 | 5 | 22.4 |
| 3 | 10 | 26.9 |

The three samples were distributed into a number of test tubes. For each test tube, a glass tube 50 cm in height and 11 cm in diameter was employed, in which a 20-cm layer of sediment was placed, with a 28-cm layer of lake water on top of it.

After the tubes had been left at rest for approximately 48 hours, a block of sodium carbonate was arranged at the surface of the sediment and the change in pH of the water and in the weight of sodium transferred into the solution were measured as a function of time. The temperature of the sample in the test tube was approximately 8° C. in each case.

First Series of Tests

In examples 1 to 3, agglomerate blocks of 40 g of sodium carbonate as such and test tubes corresponding to the three samples 1, 2 and 3, defined above, were used.
Example 1: sample no. 1.
Example 2: sample no. 2.
Example 3: sample no. 3.

Figure 2:
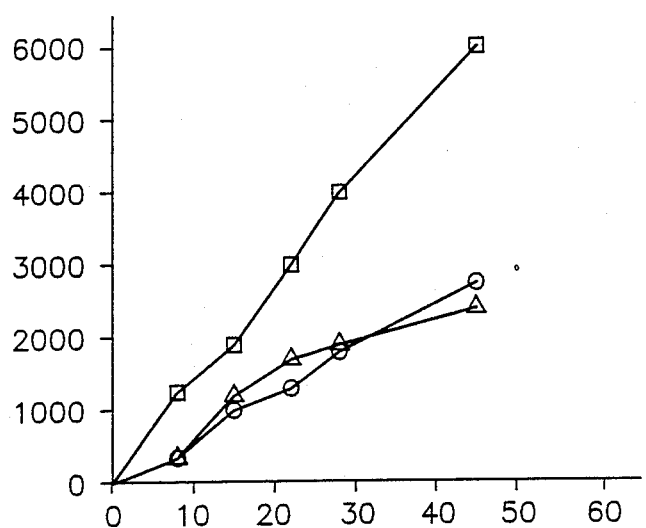
FIG. 2 is a diagram showing the change, as a function of time, of the quantity of sodium dissolving in the water of the lake treated according to the first embodiment of the process according to the invention.

The results of the measurements are shown in the diagrams of FIGS. 1 and 2. These show, as abscissae, the duration of the test (expressed in days) and, as ordinates, the pH value (FIG. 1) and the weight (in mg) of sodium dissolved in the water in the test tube (FIG. 2). In these figures,
the symbol (□) relates to Example 1,
the symbol (O) relates to Example 2,
the symbol (Δ) relates to Example 3.

Second Series of Tests

In Examples 4 to 6, 50 g blocks were used, consisting of approximately 46 g of sodium carbonate bonded with sodium silicate. The tests also related to the test tubes corresponding to the three samples 1, 2 and 3, defined above.
Example 4: sample no. 1.
Example 5: sample no. 2.
Example 6: sample no. 3.

Figure 3:
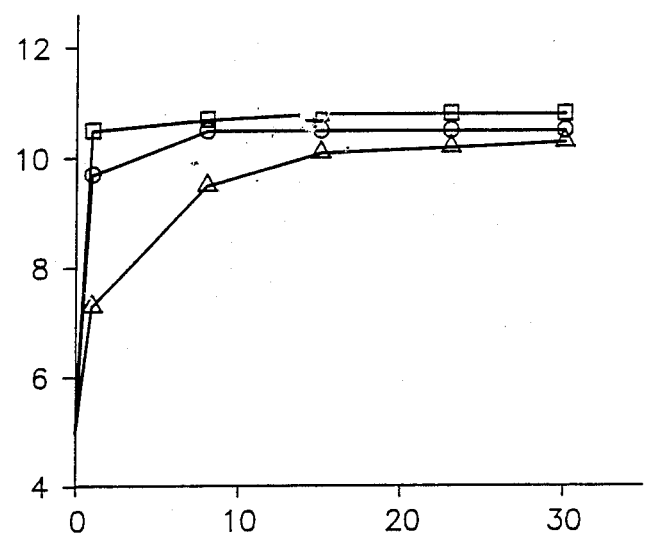
FIGS. 3 and 4 are diagrams which are similar to the diagrams of FIGS. 1 and 2 respectively, in the case where the lake is treated according to a second embodiment of the process according to the invention.
Figure 4:
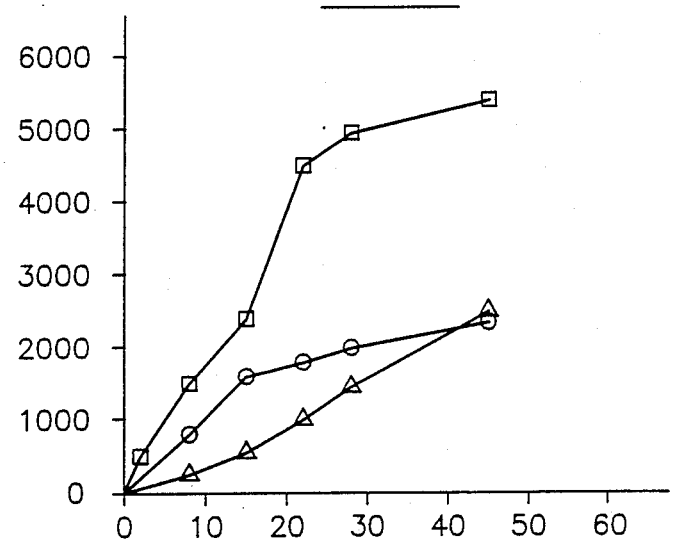

The results are shown in the diagrams of FIGS. 3 and 4, where the abscissa and ordinate scales are identical with those of FIGS. 1 and 2 respectively. Furthermore,
the symbol (□) relates to Example 4,
the symbol (O) relates to Example 5, the symbol (≢) relates to Example 6.

Examples 1 to 6 show that the increase in the pH and in the weight of sodium in the water is proportionally slower the more the sediment is rich in organic matter. This confirms that a proportion of the sodium carbonate blocks has been consumed in a process of regeneration of the ion exchange capacity of the humic matter in the sediment.

I claim:

1. Process for the neutralization of an acidic layer of water over a humic sediment in a body of water, comprising:
   providing blocks containing a sodium compound selected from the group consisting of sodium hydroxide and a sodium salt of an acid other than a hydracid, said blocks being solid at the temperature of the water to be treated, at least partially soluble in the water, and sufficiently dense to sink into the humic sediment; and
   dropping into said body of water a plurality of said blocks.

2. Process according to claim 1, wherein that the sodium compound is a salt derived from a weak acid.

3. Process according to claim 2, wherein the sodium compound is selected from the group consisting of sodium carbonate, sodium bicarbonate and sodium sesquicarbonate.

4. Process according to claim 1 wherein the blocks have mass and dimensions such that at least 1% of their mass dissolves in the water during their fall in the water layer and that at least 30% of their mass reaches the sediment in solid form.

5. Process according to claim 4, wherein the mass and the dimensions of the blocks are chosen so that between 50 and 95% of their mass reach the sediment in solid form.

6. Process according to claim 1, wherein the blocks are tipped into the layer of water.

7. Process according to claim 1, wherein the blocks are agglomerates of sodium carbonate.

8. Process according to claim 7, wherein the agglomerates of sodium carbonate comprise a binder and/or a ballasting material.

9. Process according to claim 8, wherein the agglomerates comprise between 95 and 98% by weight of sodium carbonate and between 2 and 5% by weight of sodium silicate.

10. Process according to claim 1, wherein ovoid shaped blocks are employed.

11. Process for the neutralization of a layer of acidic water over an acidic, humic sediment, comprising:
    providing blocks containing a water soluble sodium compound that are solid at the temperature of the layer of water to be treated and sufficiently dense to sink into the humic sediment, said sodium compound selected from the group consisting of sodium hydroxide and sodium salts derived from acids other than hydracids; and
    dropping the blocks into the water layer causing a portion of the sodium compound of the blocks to dissolve in the water layer during the fall of the blocks and neutralize the acidity of the water, and another portion of the sodium compound of the blocks enter the sediment, dissolve in that part of the water which impregnates the sediment, and convert the acidic humic substance into a sodium-containing humic substance which neutralizes the acidity of the water by ion exchange.

* * * * *